United States Patent Office
3,338,701
Patented Aug. 29, 1967

3,338,701
METHOD FOR THE CONTROL OF PLANT GROWTH
Edward D. Weil, Lewiston, N.Y., assignor to Hooker Chemical Corporation, Niagara Falls, N.Y., a corporation of New York
No Drawing. Continuation of application Ser. No. 413,289, Nov. 23, 1964. This application Sept. 6, 1966, Ser. No. 577,533
14 Claims. (Cl. 71—71)

This application is a continuation of application Ser. No. 413,289, filed Nov. 23, 1964, now abandoned, which is a continuation-in-part of Ser. No. 25,842 filed May 2, 1960 by Edward D. Weil and issued as U.S. Patent 3,158,461 on Nov. 24, 1964.

This invention relates to the control of plant growth, and more particularly, of weeds, by application thereto of a composition comprising cycloalkyl or cycloalkenyl phosphine oxides or sulfides.

It has now been found that cycloalkyl and cycloalkenyl phosphine oxides and sulfides of the formula

wherein R, R' and R" are monovalent aliphatic radicals, each of which has one carbon atom linked directly to phosphorous and at least one of which is cycloalkyl or cycloalkenyl, and where X is oxygen or sulfur, are effective herbicides. They are effective against both monocotyledonous and dicotyledonous species whether applied before or after weed emergence. Such activity is surprising because the phosphine oxides and sulfides are known to be unusually chemically stable and unreactive. They are lacking in labile P–O–C, P–N–C and P-halogen linkages which are present in various other known phosphorous-containing pesticides. The aliphatic radicals may be simple alkyl radicals or may contain olefinic unsaturation. They may be substituted by a member of the group consisting of halogen, amino, substituted amino, hydroxy, alkoxy and carboxy. The corresponding phosphines or phosphine-$CS_2$ addition compounds may be employed, allowing the reaction mixture to be exposed to air, which readily converts phosphines to substituted phosphine oxides. The preferred embodiments of the invention, for reasons of high activity and relatively low costs, are compounds wherein R, R' and R" are alkyl, cycloalkyl or cycloalkenyl groups of four to eight carbon atoms. Various phosphorous compounds having halogen, amino, nitrogen, alkoxy or alkylmercapto radicals bound directly to the phosphorus atom are sometimes, in some nomenclature systems, designated as phosphorous-substituted phosphines, phosphine oxides or phosphine sulfides but such derivatives are really phosphinous, phosphonous, phosphinic or phosphonic acid derivatives and use thereof does not lie within the scope of this invention. The terms phosphine, phosphine oxides and phosphine sulfides, as employed herein, refer to compounds wherein three of the valences of the phosphorus atom are linked directly to carbon atoms. These terms are employed in this manner by Kosolapoff in Organic Phosphorus Compounds at pages 99–120.

Suitable compounds of a preferred group for use in the method of the invention include the following oxides and sulfides: tricyclopentyl-; di-n-propylcyclopentyl-; diisopropylcyclopentyl-; dibutylcyclopentyl-; dipentylcyclopentyl-; dihexylcyclopentyl-; diheptylcyclopentyl-; dioctylcyclopentyl-; cyclopentyl di-n-propyl-; cyclopentyldiisopropyl-; cyclopentyldibutyl-; cyclopentyldipentyl-; cyclopentyldihexyl-; cyclopentyldiheptyl-; cyclopentyldioctyl-; tricyclopentenyl-; dicyclopentenylbutyl-; dicyclopentyl-hexyl-; (cyclohexylmethyl)dibutyl-; tris(cyclohexylmethyl)-; (cyclohexylmethyl) pentyl-; tricyclohexyl-; di-n-propylcyclohexyl-; diisopropylcyclohexyl-; dibutylcyclohexyl-; dipentylcyclohexyl-; dihexylcyclohexyl-; diheptylcyclohexyl-; dioctylcyclohexyl-; cyclohexyldi-n-propyl-; cyclohexyldiisopropyl-; cyclohexyldibutyl-; cyclohexyldipentyl-; cyclohexyldihexyl-; cyclohexyldiheptyl-; cyclohexyldioctyl-; tricyclohexenyl-; dicyclohexenylbutyl-; dicyclohexenylhexyl-; tris(4 - methylcyclohexylmethyl)-; cyclohexenyldicrotonyl-; tricycloheptyl-; tricyclooctyl-; di-n-butylcycloheptyl-; di-n-butylcyclooctyl-; dipentylcycloheptyl-; dipentylcyclooctyl-; dihexylcycloheptyl-; dihexylcyclooctyl-; cycloheptyldipropyl-; cyclooctyldipropyl-; cycloheptyldibutyl-; cyclooctyldibutyl-; cycloheptyldipentyl-; cyclooctyldipentyl-; cycloheptyldihexyl-; cycloheptyldioctyl-; tricycloheptenyl-; tricyclooctenyl-; tricyclobutyl-; and (7-octenyl)dicyclopentyl-.

These compounds, as previously stated, may contain a halogen, amino, substituted amino (preferably alkylamino or dialkylamino), hydroxy alkoxy or carboxy group. Thus, for example, phosphine oxides or sulfides of the following radicals are useful in the practice of the present invention: tris(dichlorocyclohexyl)-; tris(dibromocyclopentyl-; tris(1-aminocyclohexyl)-; tris(1(dimethylamino)-cyclohexyl)-; tris(1(ethylamino)cyclopentyl)-; tris(1-carboxycyclopentyl)-; tris(2-hydroxycyclooctenyl)-; and similar substituted compounds.

Also useful but less preferred because of lower activities are oxides and sulfides of: tricyclopropyl-; cyclooctyldimethyl-; cyclohexyldiethyl-; cyclopentyldipropyl-; methyldicyclohexyl-; ethyldicyclohexyl-; isopropyldicyclohexyl-; diallylcyclohexyl-; allylbutylcyclohexyl-; (1-diethylamino-1-cyclohexyl) dimethyl-; (1 - carboxy - 1 - cyclohexyl)-diethyl-; 2-aminoethyldicyclohexyl-; 1-methylaminomethyldicyclohexyl-; 2-hydroxyethyldicyclopentyl-; and 2-chloroethyldicyclooctyl.

Thus, the broader scope of the present invention encompasses the phosphine oxides and sulfides having lower (eight or fewer carbon atoms) cycloalkyl, cycloalkenyl, alkenyl or alkyl radicals and having at least one such cycloalkyl or cyclo alkenyl radical, and the preferred group within this broader group are those compounds wherein each of the radicals possesses from four to eight carbon atoms.

A further preferred sub-group, especially from the standpoint of manufacturing ease and herbicidal effectiveness are the phosphine oxides in which R, R' and R" are the same. Similarly, such sulfides are also preferred. Examples of such compounds include tricyclobutyl-, tricyclopentyl-, tricyclohexyl-, tricycloheptyl-, tricyclooctyl-, tricycylopentenyl-, tricyclohexenyl-, tricycloheptenyl-, and tricyclooctenyl phosphine oxides and sulfides.

The compounds used in this invention may be prepared by methods known in the art, such as by the reaction of the corresponding cycloalkyl or cycloanlkenyl Grignard reagent with phosphorus oxychloride, thiophosphoryl chloride or by oxidation of the corresponding phosphine by air or nitric acid or by sulfurization of the corresponding phosphine by sulfur. These methods are described in the Kosolapoff reference cited above.

Further production methods of such compounds include substitutions on the alkyl or alkenyl groups of the phosphine oxides or sulfides after the unsubstituted compounds have been prepared. For example, tricyclohexyl phosphine oxide may be chlorinated with elemental chlorine at sixty-five degrees centigrade under illumination by a two hundred and fifty watt mercury vapor lamp until the desired weight of chlorine has been taken up, to prepare the mono-, di-, tri- or higher chlorinated tricyclohexyl phosphine oxides. Such halogenated cycloalkyl phosphine oxides may be further reacted with amines, sodium cyanide, sodium alkoxide or other nucleophilic reagent to effect further replacement of the halogens.

The methods of the invention may be practiced by application of the pure compounds or formulations comprising such compounds to the medium to be treated, the soil or the plant, the growth of which is to be controlled or prevented. Formulations may be solutions of the compounds or mixtures thereof in solvents such as water, acetone, ethanol, other alcohols, hydrocarbons, such as benzene, kerosene, diesel oil, crude oil, xylene or other aromatic or aliphatic hydrocarbon. Solutions in organic solvent may be further dispersed in water as emulsions, with the aid of emulsifiers known to the herbicide art. The formulations may also comprise the active material on an inert carrier, usually a solid, such as clay, carbon or a vermiculite, with or without wetting or dispersing agents. Such formulations may also include other herbicides to supplement, complement, synergize or enhance the herbicidal activity of the active compounds employed in this invention. Since the present compounds are generally fast acting, they may be employed together with slower acting herbicides, such as triazine herbicides, aryl alkyl urea herbicides, 2,4-D, 2,4,5-T, aminotrichloropicolinic acid or 2,3,6-trichlorophenylacetic acid herbicides. The formulations may also include solubilizers for the active materials. For example, the phosphine oxides may be solubilized by either hydrochloric acid or other acid in aqueous solution. The mentioned formulations may also contain other adjuvants, such as sequestering agents, colorants, wetting, spreading and sticking agents, in accordance with known practices in the herbicide art.

The methods of employing the mentioned compositions include applying them to the soil prior to the emergence of weeds. They may be mixed with the soil, if desired, to aid penetration. They may also be applied to the foliage of the emerged weeds and other plants. The application to the foliage may be made for the purpose of defoliation or desiccation of the foliage or for the purpose of stunting the growth of the plant to which applied, as well as for the purpose of completely destroying the plant. For example, the compounds and compositions thereof, when sprayed onto corn foliage, killed the foliage without injury to the ears, resulting in a more rapid drying of the ears, which is often desirable, since dried corn can be stored with less deterioration than wet corn. The stunting of trees without causing the deaths thereof is useful to inhibit excessive growths of trees under electric power and telephone lines, with which they might otherwise interfere. The desiccation of cotton foliage, without killing of the plants aids in the harvesting of the bolls and in their being obtained free of excessive amounts of coloring materials and leaf fragments. The rapid general killing of foliage is also useful in removing tree, brush and other leafy cover, without destruction of the trees and plants, in areas wherein it is desirable to maintain visibility unobscured by plant growth, such as areas where roads or pipe lines are being installed, areas troubled by brigandage where the civil or military authorities want to maintain good visibility of personnel in the area, and so forth. The killing of potato vines aids in the harvesting of potatoes.

The following examples illustrate the invention. They are not limiting thereof. All parts are by weight and temperatures are in degrees centigrade unless otherwise indicated.

Example 1

A representative herbicidal composition of the invention is the following:

| | Parts |
|---|---|
| Tricyclohexyl phosphine oxide | 10 |
| Xylene (solvent) | 10 |
| Atlox 3335 (polyoxyethylene emulsifier) | 2 |

This mixture is emulsified with water in any convenient proportion for spraying.

Example 2

A second representative formulation of the material useful in the process of the invention is the following:

| | Parts |
|---|---|
| Tricyclopentenyl phosphine oxide | 1 |
| Diesel oil | 10 |

This mixture may be sprayed as is or may be further diluted with diesel oil or kerosene.

Example 3

A series of representative plant species was selected for evaluation of the herbicidal method of the invention. Greenhouse flats were seeded with beans, cucumbers, tomatoes, cabbage, millet, crabgrass and ryegrass, considered to be representative of types of plant growth and normally used in standard herbicidal testing. In pre-emergence tests, the chemical was applied in aqueous dispersion prior to emergence of the seedlings. In post-emergence tests the chemical was applied to the seedlings about two weeks after emergence. The resultant control of plant growth was determined about one week after application of the chemical. The observed results were as follows:

| Chemical Applied | Post-Emergence (Rate of 4 pounds/acre) | | | | | | |
|---|---|---|---|---|---|---|---|
| | Beans | Cuc. | Tom. | Cab. | Millet | Crabgrass | Ryegrass |
| Tricyclopentylphosphine oxide | 8 | 5 | 8 | 5 | 5 | 5 | 5 |
| Tricyclohexylphosphine oxide | 10 | 10 | 9 | 4 | 5 | 4 | 0 |
| Cyclohexyldi-n-hexylphosphine oxide | 9 | 9 | 8 | 9 | 5 | 9 | 10 |
| | Pre-Emergence (Rate of 8 pounds/acre) | | | | | | |
| Tricyclopentylphosphine oxide | 7 | 5 | 9 | 6 | 7 | 6 | 7 |

Scale: 0=no effect; 1-3=slight control; 4-6=moderate control; 7-9=strong control; 10=complete kill.
Abbreviations: Cuc.=cucumbers; Tom.=tomatoes; Cab.=cabbages.

In addition to the above data, it is noted that tricyclohexylphosphine oxide exerts a strong controlling effect against crabgrass when applied at the rate of 8 pounds/acre in pre-emergent treatments. When the sulfides are employed in place of the oxides, good results such as those given above are also obtained.

Example 4

Tests for desiccation activity on foliage were conducted by spraying the compounds in aqueous solution or dispersion at rates equivalent to 0.1 and 1.0 pound/acre.

| Chemical applied | 0.1 pound/acre, days after spraying | | 1.0 pound/acre, days after spraying | |
|---|---|---|---|---|
| | 3-4 | 12-15 | 3-4 | 12-15 |
| Tricyclopentylphosphine oxide | 1 | 4 | 7 | 9 |
| Tricyclohexylphosphine oxide | 2 | 6 | 8 | 9 |
| Cyclopentyldi-n-butylphosphine oxide | 3 | 3 | 10 | 10 |
| Cyclopentyldi-n-pentylphosphine oxide | 4 | 5 | 10 | 10 |
| Cyclopentyldi-n-pentylphosphine sulfide | 0 | 0 | 7 | 9 |
| Cyclohexyldi-n-hexylphosphine oxide | 0 | 4 | 7 | 9 |

Scale: 0=no effect; 1-3=slight desiccation; 4-6=moderate desiccation; 7-9=severe desiccation; 10=complete foliar kill.

Example 5

The effects of various comparison materials and tricyclohexylphosphine oxide were compared. It was found that the compound employed by the method of this invention was significantly more effective against both grasses and broadleaf weeds, as shown in the following table.

An area infested with well-established perennial grasses, mostly quackgrass, and perennial broadleaf weeds, mostly plantain, wild carrot, and goldenrod, was divided into plots and sprayed with diesel oil formulations, similar to those of Example 2, at the rate of eighty gallons of oil per acre containing four pounds per acre of the test herbicide. Comparison plots were also sprayed using eighty gallons per acre and higher rates of the oil alone. The results, in terms of severity of "top kill" (foliar destruction) were observed three days later and are tabulated below:

| Chemical | Severity of Top Kill | |
|---|---|---|
| | Grasses | Broadleaf Weeds |
| Oil alone (80 gallons/acre) | None | None. |
| Oil alone (160 gallons/acre) | do | Do. |
| Oil alone (320 gallons/acre) | None or slight | None or slight. |
| n-Butyl phosphate (mono,- dimixtures) | None | None. |
| Trilauryl trithiophosphate | do | Do. |
| Tris(2-chloroethyl)phosphate | do | Do. |
| Tricyclohexylphosphine oxide | Moderate to severe. | Moderate to severe. |

The present invnetion has been described with respect to examples, given for illustration, not limitation. Many other modifications and substitutions of equivalents will naturally suggest themselves to those skilled in the art, based on the present disclosure, and are within the invention.

What is claimed is:

1. A method for the control of plant growth which comprises applying to the medium to be treated a growth controlling amount of a composition of the formula

wherein R, R' and R'' are monovalent radicals selected from the group consisting of lower cycloalkyl, lower cycloalkenyl, lower alkyl, lower alkenyl, lower haloalkyl, lower aminoalkyl, lower alkylaminoalkyl, lower dialkylaminoalkyl, lower hydroxalkyl and lower carboxyalkyl, wherein R, R' and R'' each have one carbon atom linked directly to the phosphorus atom, and at least two of these radicals are selected from the group consisting of lower cycloalkyl and lower cycloalkenyl, and X is selected from the group consisting of oxygen and sulfur.

2. The method of claim 1 wherein R, R' and R'' are each lower cycloalkyl of from 4 to 8 carbon atoms.

3. The method of claim 1 wherein at least one of the monovalent radicals, R, R' and R'', is lower cycloalkyl of 4 to 8 carbon atoms.

4. The method of claim 1 wherein at least one of the monovalent radicals, R, R' and R'', is lower cycloalkyl.

5. The method of claim 1 wherein at least one of the monovalent radicals, R, R' and R'', is lower cycloalkenyl.

6. The method of claim 1 wherein at least one of the monovalent radicals, R, R' and R'', is lower carboxycycloalkyl.

7. The method of claim 1 wherein at least one of the monovalent radicals, R, R' and R'', is di-lower-alkyl-aminocyclo-lower-alkyl.

8. The method of claim 2 wherein R, R' and R'' are the same.

9. The method of claim 8 wherein R, R' and R'' are each cyclopentyl and X is oxygen.

10. The method of claim 8 wherein R, R' and R'' are each cyclohexyl and X is oxygen.

11. The method of claim 1 wherein a herbicidally effective amount of

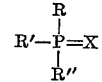

is applied.

12. The method of claim 11 wherein R, R' and R'' are each lower cycloalkyl of from 4 to 8 carbon atoms.

13. The method of claim 12 wherein R, R' and R'' are each cyclopentyl and X is oxygen.

14. The method of claim 12 wherein R, R' and R'' are each cyclohexyl and X is oxygen.

References Cited

UNITED STATES PATENTS

| | | | |
|---|---|---|---|
| 2,714,064 | 7/1955 | Morris et al. | 71—2.7 X |
| 2,844,454 | 7/1958 | Birum | 71—2.7 |
| 2,927,014 | 3/1960 | Goyette | 71—2.3 |
| 3,104,259 | 9/1963 | Harwood et al. | 71—2.3 |
| 3,158,461 | 11/1964 | Weil | 71—2.7 |

OTHER REFERENCES

Plant Regulators, National Academy of Sciences, National Research Council, Publication 384, CBCC Positive Data Series No. 2, June 1955, pp. A, B, C, 1 and 38.

LEWIS GOTTS, *Primary Examiner.*

J. O. THOMAS, Jr., *Assistant Examiner.*